US012728713B2

(12) United States Patent
Tobolski et al.

(10) Patent No.: US 12,728,713 B2
(45) Date of Patent: Sep. 8, 2026

(54) SKIRT LOCKS FOR RECREATIONAL VEHICLES

(71) Applicant: Thor Tech, Inc., Elkhart, IN (US)

(72) Inventors: Trent Tobolski, Granger, IN (US); Vishnu Ramkumar, Kalamazoo, MI (US); Merle Yoder, Elkhart, IN (US)

(73) Assignee: Thor Tech, Inc., Elkhart, IN (US)

( * ) Notice: Subject to any disclaimer, the term of this patent is extended or adjusted under 35 U.S.C. 154(b) by 215 days.

(21) Appl. No.: 18/792,025

(22) Filed: Aug. 1, 2024

(65) Prior Publication Data

US 2026/0034872 A1 Feb. 5, 2026

(51) Int. Cl.
*B60J 11/00* (2006.01)
*B60P 3/36* (2006.01)

(52) U.S. Cl.
CPC *B60J 11/00* (2013.01); *B60P 3/36* (2013.01)

(58) Field of Classification Search
CPC ............ B60J 11/00; B60P 3/36; B62D 35/001
USPC ......................................... 296/156, 164, 168
See application file for complete search history.

(56) References Cited

U.S. PATENT DOCUMENTS 3,722,156 A * 3/1973 Bryant ...................... B60P 3/36 52/155
4,258,817 A * 3/1981 Hunt ........................ B60V 1/16 180/127
4,549,378 A * 10/1985 Ayers ................. E04B 1/34342 52/169.12
10,710,648 B2 7/2020 Macherel et al.

FOREIGN PATENT DOCUMENTS

CN 203961200 11/2014

* cited by examiner

*Primary Examiner* — Adam J Waggenspack
(74) *Attorney, Agent, or Firm* — Dinsmore & Shohl LLP

(57) ABSTRACT

A recreational vehicle (RV) may include a chassis and an RV body supported by the chassis. The RV body may include an exterior wall. The RV may further include an RV skirt including an upper portion and a lower portion and a skirt lock. The skirt lock may include a skirt lock body including a rear side and a front side. The skirt lock may further include a resilient securement slot between the rear side and the front side of the skirt lock body. The resilient securement slot may include a securement surface that may secure the upper portion of the RV skirt within the resilient securement slot. The skirt lock may also include a plurality of fasteners, extending through the skirt lock and the RV skirt into the RV body to fasten the skirt lock and the RV skirt to the exterior wall of the RV body.

19 Claims, 6 Drawing Sheets

SKIRT LOCKS FOR RECREATIONAL VEHICLES

BACKGROUND

The present disclosure relates to recreational vehicles. Specifically, the present disclosure relates to skirt locks of recreational vehicles and methods of attaching thereon.

BRIEF SUMMARY

According to the subject matter of the present disclosure, skirt locks are provided for recreational vehicles. (RVs). Contemplated skirt locks may include a resilient securement slot between a rear side and a front side of the of a skirt lock body to adequately secure an RV skirt to an RV body.

RV skirts may typically be installed on an RV body using a rolled steel skirt lock. However, rolled steel skirt locks do not provide adequate securement of the RV skirt, and quickly deteriorate over time. In the embodiments illustrated herein, the RV skirt may be secured to the RV body through the use of a skirt lock with a resilient securement slot to adequately secure the RV skirt within the resilient securement slot of the skirt lock. Moreover, a plurality of fasteners extend through the skirt lock and the skirt into the RV body to fasten the skirt lock to the RV body.

In accordance with one embodiment of the present disclosure, a recreational vehicle (RV) may include a chassis. An RV body may enclose a living area supported by the chassis and the RV body may include an exterior wall. The RV may further include an RV skirt including an upper portion and a lower portion and a skirt lock. The skirt lock may include a skirt lock body including a rear side and a front side. The rear side of the skirt lock body may be secured to the exterior wall of the RV body and the front side may face away from the RV body. The skirt lock may further include a resilient securement slot between the rear side and the front side of the skirt lock body. The resilient securement slot may include a securement surface that secures the upper portion of the RV skirt within the resilient securement slot. The skirt lock may also include a plurality of fasteners extending through the skirt lock and the RV skirt into the RV body to fasten the skirt lock and the RV skirt to the exterior wall of the RV body.

In accordance with another embodiment of the present disclosure, a method of fastening an RV skirt to an exterior wall of an RV body may include securing a rear side of a skirt lock body to the exterior wall of the RV. The skirt lock body may include the rear side, a front side, and a resilient securement slot between the rear side and front-side of the skirt lock body. The resilient securement slot may include a securement surface. The method may further include securing an upper portion of the RV skirt within the resilient securement slot by sliding the upper portion of the RV skirt into the resilient securement slot in contact with the securement surface and fastening the skirt lock and the RV skirt to the exterior wall of the RV using a plurality of fasteners.

In accordance with still another embodiment of the present disclosure, a skirt lock may include a front side, a rear side, a resilient securement slot, and a fastener-receiving skirt lock tail. The resilient securement slot may be positioned between the front side and the rear side of the skirt lock along a skirt locking plane. The resilient securement slot may include an upper closed end, and a lower open end for receiving an upper portion of an RV skirt and a securement surface positioned along the skirt locking plane. The securement surface may include opposing surface portions on opposite sides of the resilient securement slot and may define a dynamic coefficient of friction, relative to an RV skirt moving into the skirt lock slot, that may be significantly lower than a static coefficient of friction relative to an RV skirt at rest in the resilient securement skirt lock slot. The front side of the skirt lock may extend downwardly from a sealing edge to a drip edge of the skirt lock and the rear side of the skirt lock may extend downwardly along a direction of the skirt locking plane below the open end of the resilient securement slot and the drip edge of the skirt lock to form the fastener-receiving skirt lock tail.

Although the concepts of the present disclosure are described herein with primary reference to RVs, it is contemplated that the concepts will enjoy applicability to any vehicle. For example, and not by way of limitation, it is contemplated that the concepts of the present disclosure will enjoy applicability to cars, trucks, tractor-trailers, or any other suitable vehicle.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1A:
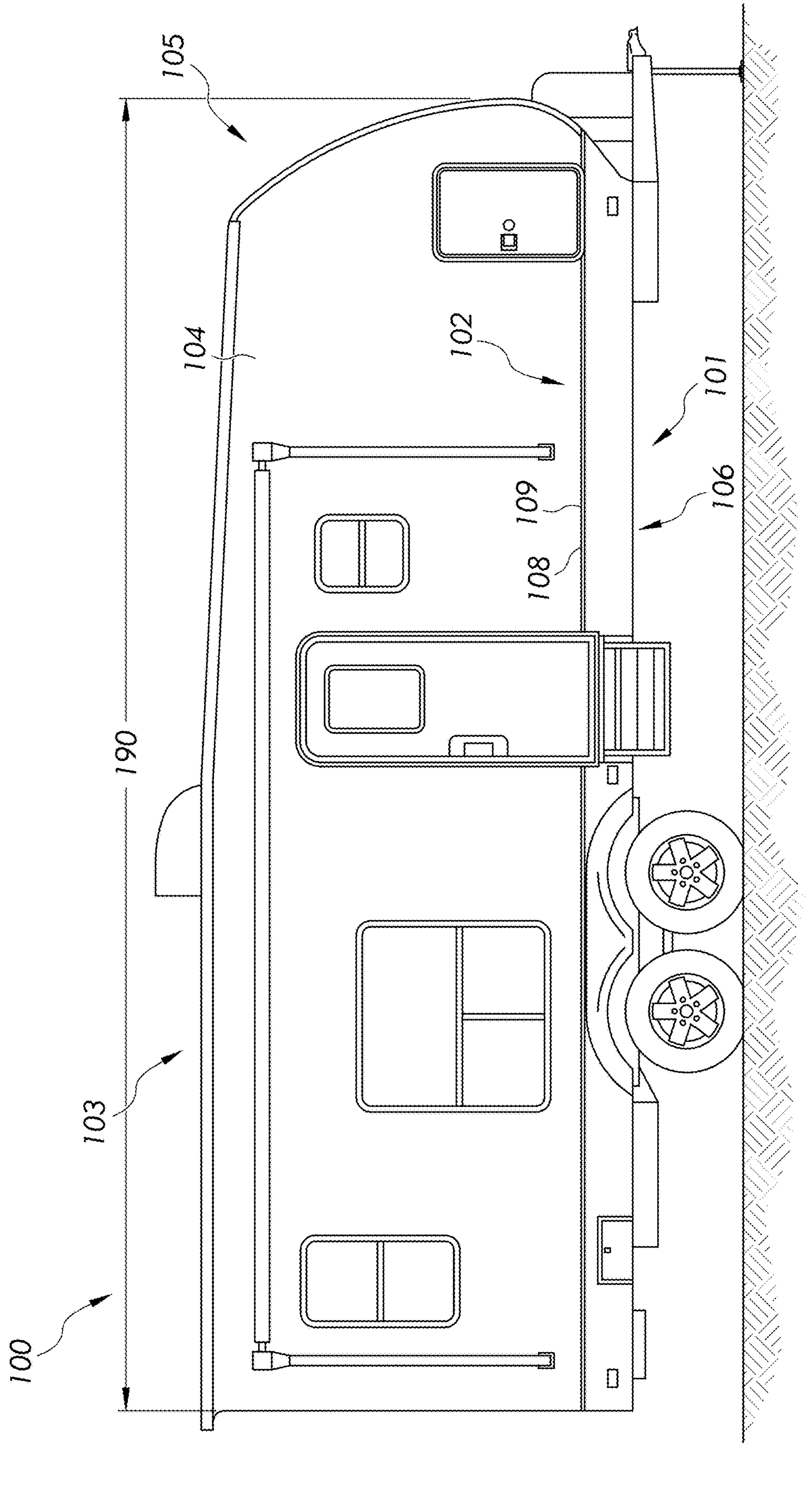
FIG. 1A illustrates a recreational vehicle (RV) with a skirt lock.
Figure 1B:
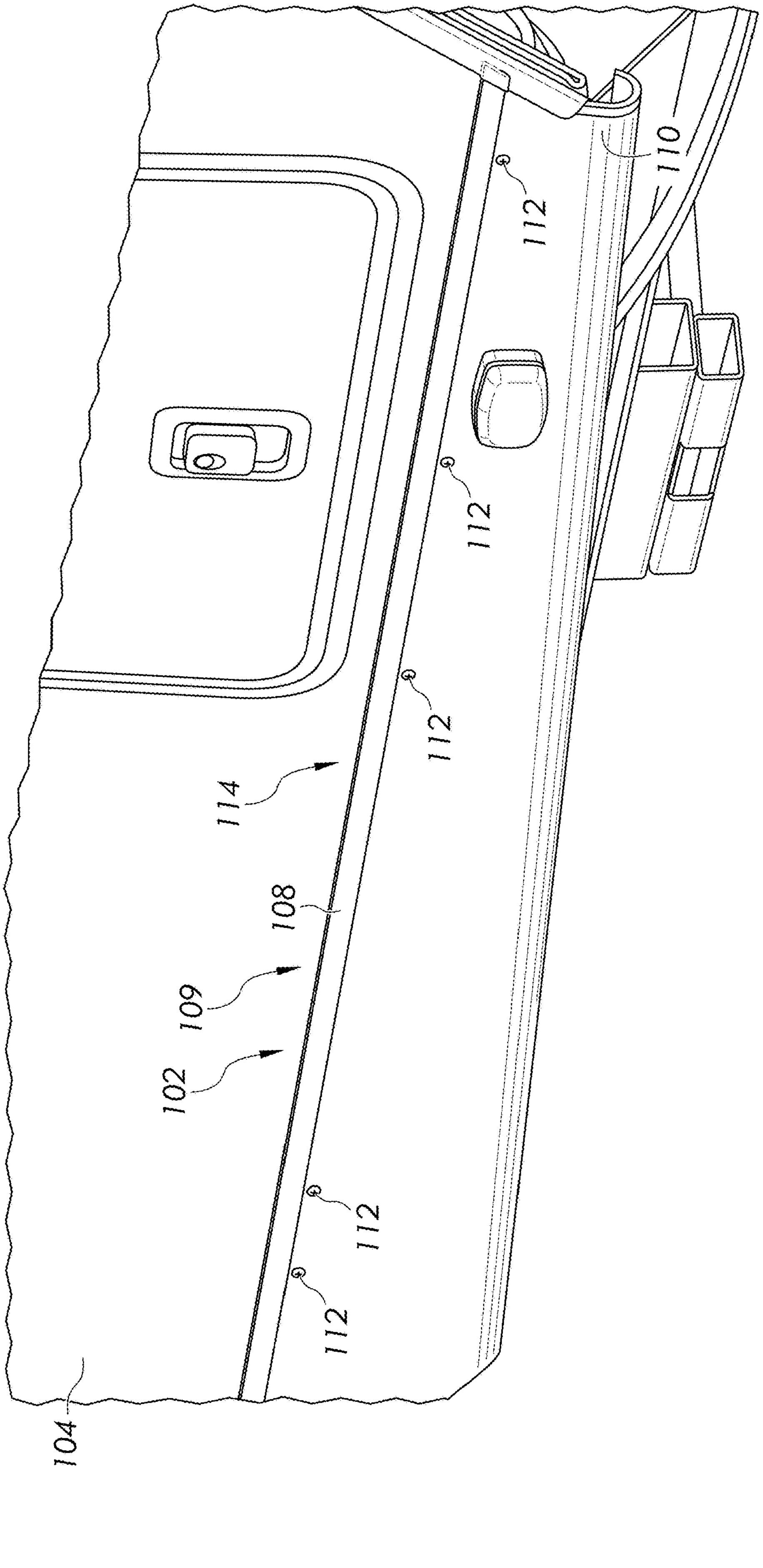
FIG. 1B illustrates a perspective view of the RV with the skirt lock of FIG. 1A.

FIG. 1A and FIG. 1B show a recreational vehicle 100 (RV 100) with a traditional skirt lock 102 attached thereto. The RV includes a chassis 101 and an RV body 103 enclosing a living area 105 supported by the chassis 101. The RV body

103 includes exterior walls 104 that enclose the living area 105. The traditional skirt lock 102 is attached to one or more exterior walls 104 of the RV 100 to attach a trailer skirt 110 to the RV 100, which protects the exterior walls 104 and undercarriage 106 of the RV 100.

During manufacturing, the rolled steel 108 is used as the traditional skirt lock body 109 and is attached to the exterior walls 104 through the use of adhesive. As further depicted in FIG. 1B, the trailer skirt 110 may be pushed into the rolled steel 108, such that the trailer skirt 110 is secured to the exterior walls 104 through the rolled steel 108. The rolled steel 108 and the trailer skirt 110 are then fastened onto the exterior walls 104 through the use of fasteners 112 that extend through the rolled steel 108 and the exterior walls 104. Use of the rolled steel 108 in the traditional skirt lock 102 poses several issues. Namely, the rolled steel 108 may be heavy, resulting in decreased fuel efficiency of the RV 100. Moreover, the trailer skirt 110 may not be adequately secured to the exterior walls 104 during manufacturing through the use of the rolled steel 108. As such, the trailer skirt 110 may slip out of place before the fasteners 112 are used to fasten the trailer skirt 110 to the exterior wall 104. Moreover, there may be a gap between the rolled steel 108 and the exterior wall 104 due to the use of the adhesive. Liquids may leak in the gap between the rolled steel 108 and the exterior walls 104, resulting in rust/damage to the exterior wall 104, trailer skirt 110, or fasteners 112. While, caulk 114 may be used to fill the gap, liquids may continue to leak into the gap over time as the caulk 114 wears away as the RV 100 is driven. As such, a need exists for an improved skirt lock that more adequately secures the trailer skirt 110 to the exterior wall 104 during manufacturing and prevents liquid from leaking between the exterior wall 104, the traditional skirt lock 102, and the trailer skirt 110.

Embodiments of the present disclosure set forth an improved skirt lock that more reliably secures a trailer skirt in place during manufacturing, is lightweight for improved efficiency, and eliminates the need for caulk to prevent liquid leakage into a gap between the RV and skirt lock.

Figure 2A:
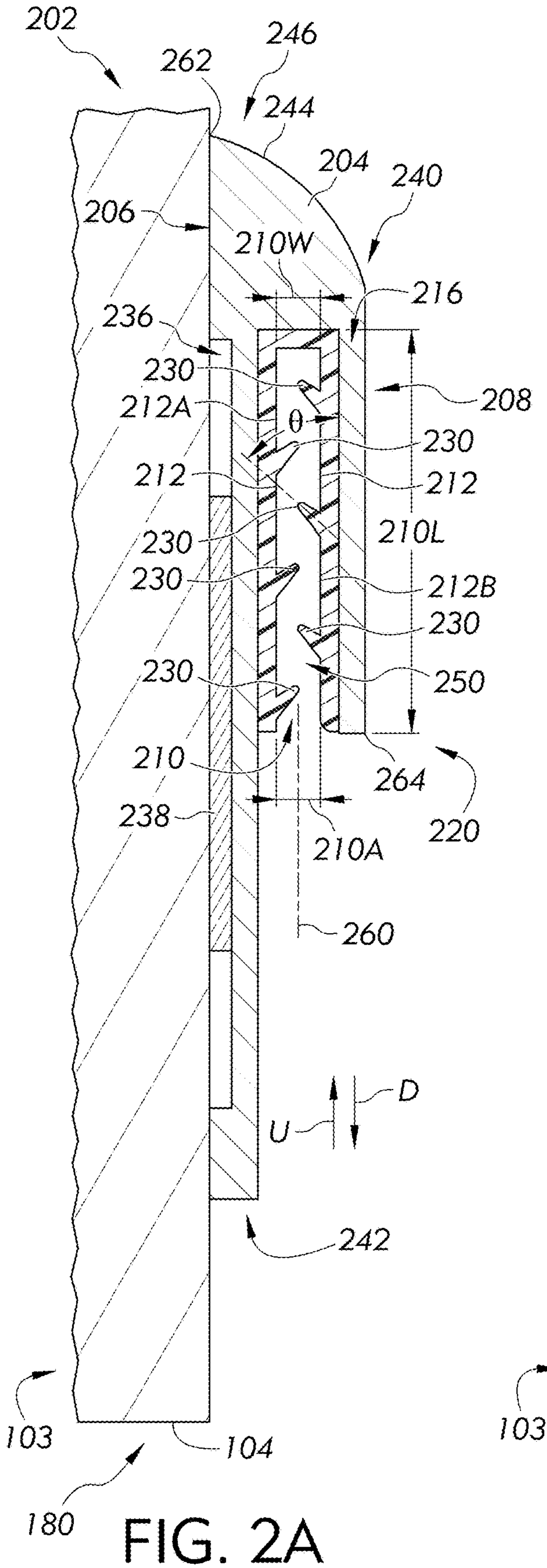
FIG. 2A illustrates a cross-sectional view of a skirt lock, according to one or more embodiments of the present disclosure.
Figure 2B:
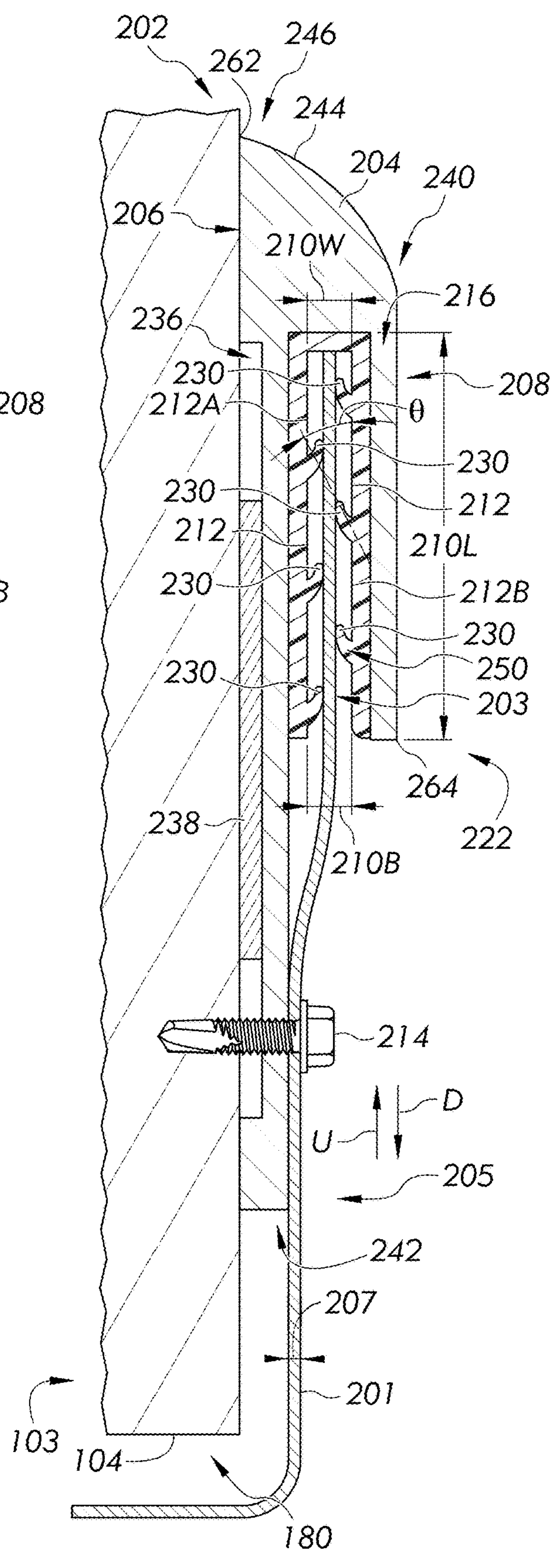
FIG. 2B illustrates a cross-sectional view of the skirt lock of FIG. 2A with an RV skirt inserted therein, according to one or more embodiments of the present disclosure.

FIG. 2A and FIG. 2B depict a cross-sectional view of an improved trailer skirt lock for securing a trailer skirt to an RV. More specifically, FIG. 2A depicts a skirt lock 202 that secures an RV skirt 201 (which has an upper portion 203 and a lower portion 205) to the exterior wall 104 of the RV body 103. The skirt lock 202 includes a skirt lock body 204 including a rear side 206 and a front side 208, such that the rear side 206 of the skirt lock body 204 is secured to the exterior wall 104 of the RV body 103 and the front side 208 of the skirt lock body 204 faces away from the RV body 103. The skirt lock 202 may further include a resilient securement slot 210 between the rear side 206 and the front side 208 of the skirt lock body 204. The resilient securement slot 210 includes a securement surface 212 that secures the upper portion 203 of the RV skirt 201 within the resilient securement slot 210. The RV 100 includes a plurality of fasteners 214 extending through the skirt lock 202 and the RV skirt 201 into the RV body 103 to fasten the skirt lock 202 and the RV skirt 201 to the exterior wall 104 of the RV body 103. In embodiments, the RV skirt 201 may be positioned at a bottom edge 180 of the RV body 103.

The securement surface 212 of the resilient securement slot 210 secures the RV skirt 201 to the RV body 103 during manufacturing. The securement surface 212 may include opposing surface portions 212A and 212B on opposite sides of the resilient securement slot 210. The opposing surface portions 212A and 212B may define the securement surface 212. As depicted in FIGS. 2A-2B, the securement surface 212 may include a U-shaped cross-section 216, such that the securement surface 212 secures the RV skirt 201 within the resilient securement slot 210 through a press-fit.

The resilient securement slot 210 may have a resilient securement slot width 210W between the opposing surface portions 212A and 212B of the securement surface 212. The resilient securement slot width 210W may include a first width 210A between the opposing surface portions 212A and 212B before the upper portion 203 of the RV skirt 201 is positioned within the resilient securement slot 210, and a second width 210B between the opposing surface portions 212A and 212B after the upper portion 203 of the RV skirt 201 is positioned within the resilient securement slot 210. As such, the resilient securement slot 210 may expand from a compressed state 220 to an expanded state 222 when the RV skirt 201 is inserted within the resilient securement slot 210, as depicted in FIGS. 2A and 2B, respectively. Specifically, the RV skirt 201 may be inserted along a skirt locking plane 260 within the resilient securement slot 210. The skirt locking plane 260 may be substantially parallel to the exterior wall 104 of the RV 100.

The first width 210A in the compressed state 220 may expand to the second width 210B in the expanded state 222 when the RV skirt 201 is positioned within the resilient securement slot 210. The first width 210A may be 0.01 inches (0.25 mm), 0.05 inches (1.27 mm), 0.1 inches (2.54 mm), 0.2 inches (5.08 mm), or 0.3 inches (7.62 mm). The first width 210A may also be relative to an RV skirt width 207. The first width 210A may be a quarter of the RV skirt width 207, half of the RV skirt width 207, three-quarters of the RV skirt width 207, or equal to the RV skirt width 207. After the RV skirt 201 is inserted into the resilient securement slot 210, the first width 210A may expand to the second width 210B, which may be 0.05 inches (1.27 mm), 0.1 inches (2.54 mm), 0.2 inches (5.08 mm), 0.3 inches (7.62 mm), or 0.5 inches (12.7 mm). The second width 210B may also be defined relative to the RV skirt width 207. The second width 210B may be equal to the RV skirt width 207, 1.25 times greater than the RV skirt width 207, 1.5 times greater than the RV skirt width 207, or 2 times greater than the RV skirt width 207. In the expanded state 222, the second width 210B may be equal to the RV skirt width 207 when there are no surface projections 230, or and greater than the RV skirt width 207 when the surface projections 230 are included (as discussed further below).

In embodiments, the resilient securement slot 210 may exert a compressive force on the RV skirt 201 when the upper portion 203 of the RV skirt 201 is inserted into the skirt lock 202 to secure the RV skirt 201 within the resilient securement slot 210. The compressive force may be between 20 psi and 300 psi, between 30 psi and 280 psi, between 50 psi and 250 psi, or between 75 psi and 200 psi. The skirt lock 202 may also be configured to secure an RV skirt 201 of a particular weight. In embodiments, the skirt lock 202 may be configured to be capable of securing an RV skirt 201 weighing from approximately 1 pound (0.45 kg) to approximately 20 pounds (9 kg), approximately 5 pounds (2.27 kg) to approximately 15 pounds (6.8 kg), approximately 7 pounds (3.17 kg) to approximately 13 pounds (5.9 kg), or approximately 8 pounds (3.63 kg) to approximately 12 pounds (5.44 kg).

The resilient securement slot 210 may also include a slot length 210L. The slot length 210L may be approximately 0.5 inches (12.7 mm), 0.7 inches (17.78 mm), 1 inch (25.4 mm), (1.5 inches (38.1 mm), 2 inches (50.8 mm), or 5 inches (127 mm). In embodiments, the slot length 210L may be equal to the upper portion 203 of the RV skirt 201 such that an entirety of the upper portion 203 of the RV skirt 201 is inserted within the resilient securement slot 210. The slot length 210L of the resilient securement slot 210 may be uniform in width, as depicted in FIGS. 2A-2B, such that the resilient securement slot 210 is U-shaped in cross-section. The resilient securement slot 210 may include an upper closed end 225 and a lower open end 226 (as depicted in FIG. 3C), such that the lower open end 226 may receive the upper portion 203 of the RV skirt 201.

While reference is made to a single skirt lock 202 and RV skirt 201, in embodiments, there may be a plurality of skirt locks 202 or a plurality of RV skirts 201, such that the plurality of skirt locks 202 and/or the plurality of RV skirts 201 are adjacent to one another along a length 190 of the RV body 103 (as depicted in FIG. 1).

Figure 3C:
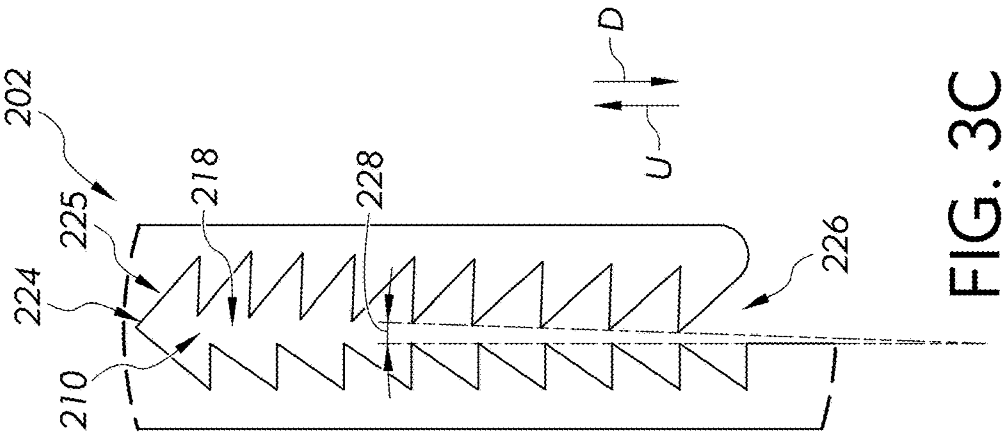
FIG. 3C illustrates a cross-sectional view of the skirt lock of FIG. 3B taken along line 3C, according to one or more embodiments of the present disclosure.
Figure 3B:
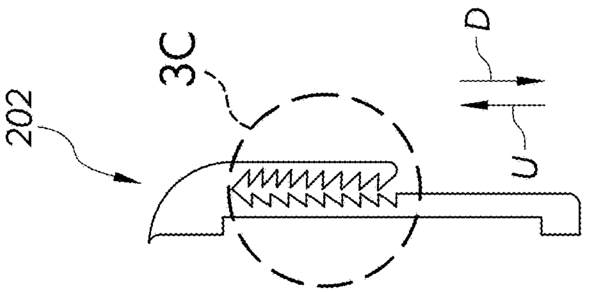
FIG. 3B illustrates a cross-sectional view of the skirt lock of FIG. 3A, according to one or more embodiments of the present disclosure.
Figure 3A:
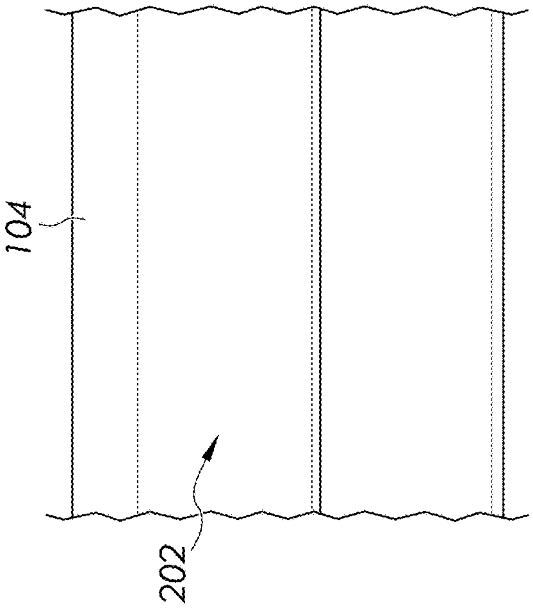
FIG. 3A illustrates a side-view of a skirt lock, according to one or more embodiments of the present disclosure.

Referring now to FIGS. 3A-3C, the resilient securement slot width 210W may be non-uniform in width, such that the opposing surface portions 212A and 212B of the securement surface 212 define an upwardly expanding skirt lock width 218. In such embodiments, the resilient securement slot width 210W may be non-uniform in the compressed state 220 when the RV skirt 201 is not inserted in the resilient securement slot 210, and the resilient securement slot width 210 may be uniform in the expanded state 222 when the RV skirt 201 is inserted into the resilient securement slot 210. As such, the resilient securement slot width 210W at a top slot end 224 of the resilient securement slot 210 is greater than the resilient securement slot width 210W at the lower open end 226 of the resilient securement slot 210 when the resilient securement slot 210 is in the compressed state 220 (i.e., the RV skirt 201 has not been placed within the resilient securement slot 210). When in the expanded state 222, the resilient securement slot width 210W at the top slot end 224 of the resilient securement slot 210 is substantially equal to the resilient securement slot width 210W at the lower open end 226 of the resilient securement slot 210. This allows for the opposing surface portions 212A and 212B of the securement surface 212 to apply a uniform pressure on the RV skirt 201 when the RV skirt 201 is placed within the resilient securement slot 210.

Referring to FIG. 3C, the opposing surface portions 212A and 212B of the securement surface 212 may define an upward expansion angle 228. The upward expansion angle 228 may be measured between the opposing surface portions 212A and 212B of the securement surface 212 at the top slot end 224 of the resilient securement slot 210. In embodiments, the upward expansion angle 228 may be between approximately 0.5 degrees and approximately 10 degrees, between approximately 1 degree and approximately 9 degrees, between approximately 2 degrees and approximately 8 degrees, between approximately 1 degree and approximately 5 degrees, or between approximately 4 degrees and approximately 6 degrees.

Referring again to FIGS. 2A and 2B, the securement surface 212 may include various securement surface features 250 that secure the RV skirt within the resilient securement slot 210. In embodiments, the securement surface 212 may include surface projections 230 extending from the securement surface 212 that secure the upper portion 203 of the RV skirt 201 within the resilient securement slot 210. The surface projections 230 may be alternatively positioned (as depicted in FIGS. 2A and 2B. In embodiments, the surface projections 230 may mirror one another on the opposing surface portions 212A and 212B (i.e., on opposite sides of the resilient securement slot 210). The surface projections 230 may extend an entirety of the securement surface 212, or only a part of the securement surface 212. As depicted in FIGS. 4-5, the surface projections 230 may include, for example, a plurality of rounded rubber stops 234 or corrugated securement surface features 256.

In embodiments, the surface projections 230 may be shaped and oriented such that the resilient securement slot 210 as a whole defines a static coefficient of friction in a downward direction D that is greater than a dynamic coefficient of friction in an upward direction U. The static coefficient of friction in the downward direction D being greater than the dynamic coefficient of friction in the upward direction U makes it relatively easy to insert the RV skirt 201 into the resilient securement slot 210 of the skirt lock 202 in the upward direction U, while also making it relatively difficult to remove the RV skirt 201 from the resilient securement slot 210 of the skirt lock 202 in the downward direction D. As such, during manufacturing, an installer may easily insert the upper portion 203 of the RV skirt 201 into the resilient securement slot 210 of the skirt lock 202 with little force in the upward direction U and the RV skirt 201 may remain in the resilient securement slot 210 until the plurality of fasteners 214 are extended through the RV skirt 201 and the skirt lock 202 (as discussed further below). In embodiments, the surface projections 230 may be upwardly angled (as depicted in FIGS. 2A and 2B) such that the resilient securement slot 210 defines the dynamic coefficient of friction in the upward direction U from the perspective of an RV skirt 201 moving into the skirt lock 202, and a static coefficient of friction in the opposite direction (i.e., the downward direction D) from the perspective of an RV skirt 201 at rest in the resilient securement slot 210. The dynamic coefficient of friction may be significantly lower than the static coefficient of friction.

In embodiments, as depicted in FIG. 2A, the surface projections 230 may form an angle θ with the securement surface 212. The angle θ between the surface projections 230 and the securement surface 212 may be from 10 degrees to 90 degrees, from 20 degrees to 80 degrees, from 30 degrees to 70 degrees, or from 30 degrees to 60 degrees. The angle θ may be the same between all the surface projections 230 and the securement surface 212. Alternatively, the angle θ may be different between the different surface projections 230 and the securement surface 212. The angle θ may change as the RV skirt 201 is inserted into the skirt lock 202, such that the angle θ becomes smaller when the resilient securement slot 210 is in the compressed state 220.

Figure 4A:
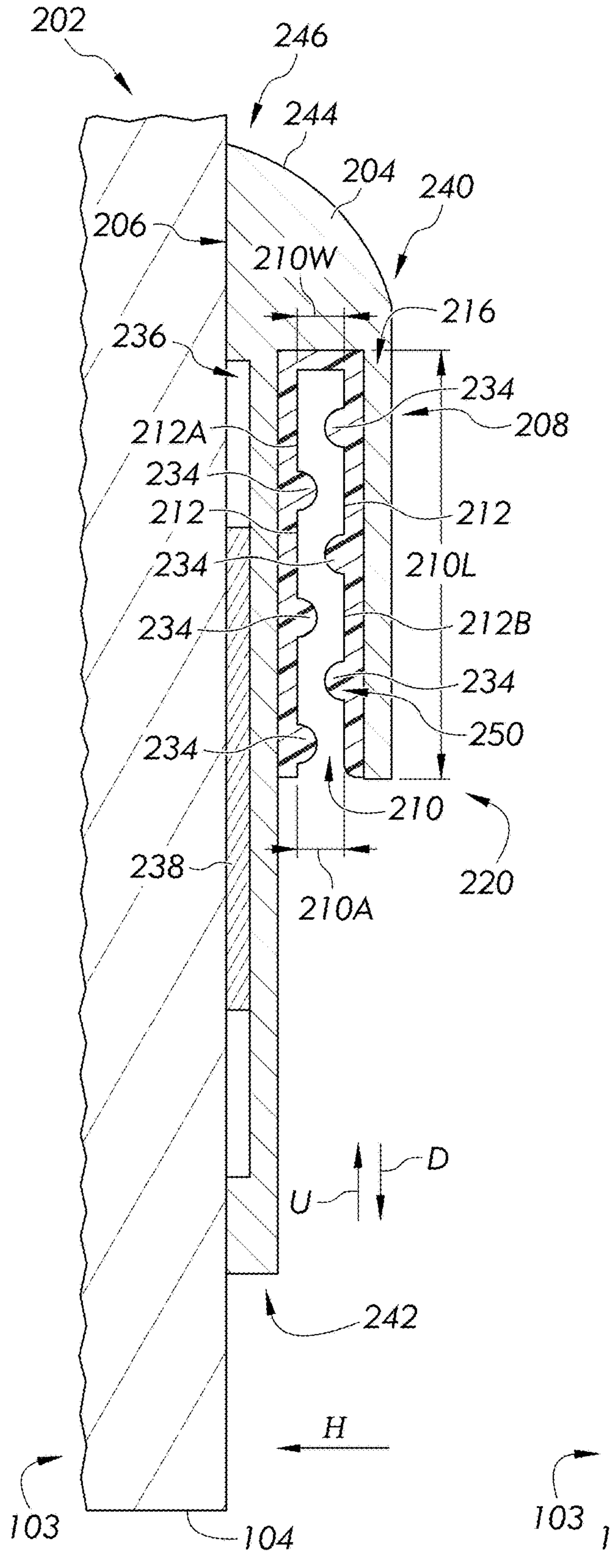
FIG. 4A illustrates a cross-sectional view of a skirt lock, according to one or more embodiments of the present disclosure.
Figure 4B:
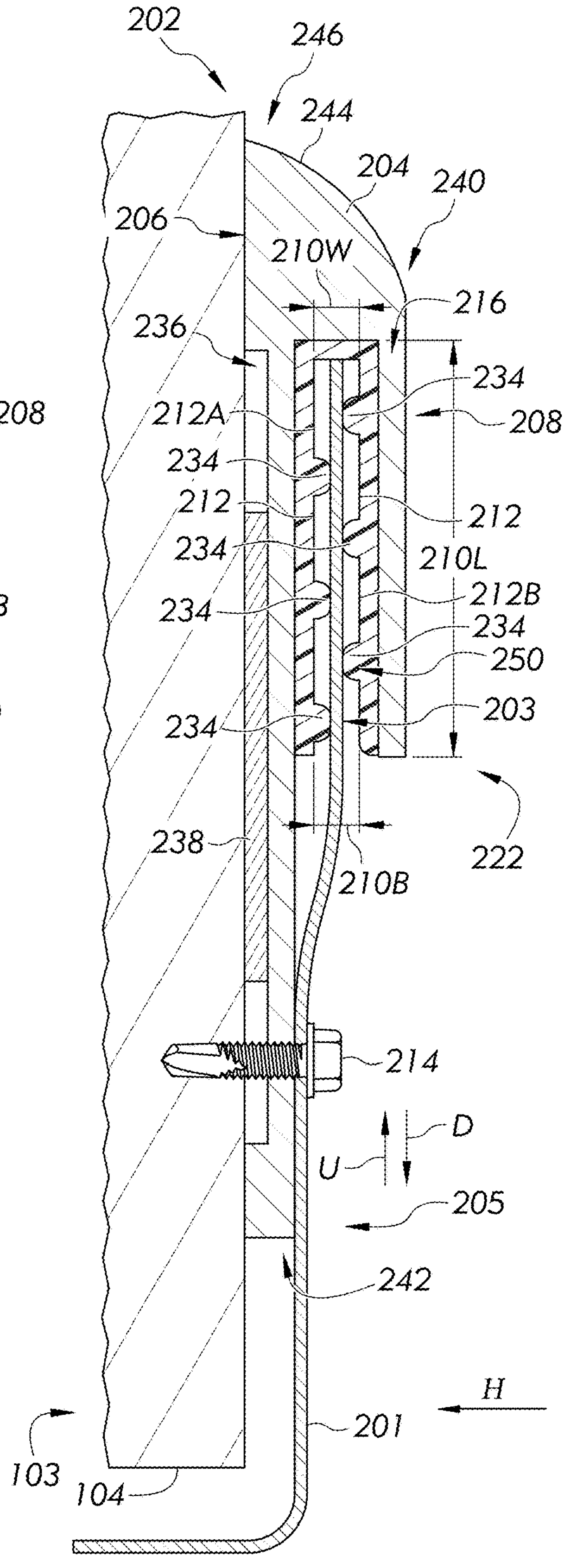
FIG. 4B illustrates a cross-sectional view of the skirt lock of FIG. 4A with an RV skirt inserted therein, according to one or more embodiments of the present disclosure.

In embodiments, there may be no surface projections 230 on the securement surface 212. Rather, the securement surface 212 itself may secure the RV skirt 201 within the resilient securement slot 210. Referring now to FIGS. 4A and 4B, the securement surface 212 may also include a plurality of rounded rubber stops 234. The plurality of rounded rubber stops 234 may be secured to the securement surface 212 or be a part of the securement surface 212. As depicted in FIG. 4B, when the RV skirt 201 is inserted within the resilient securement slot 210, the plurality of rounded rubber stops 234 may prevent the RV skirt 201 from exiting the resilient securement slot 210 in the downward direction D (similar to the functioning of the surface projections 230). The plurality of rounded rubber stops 234 may be alternatively positioned, as depicted in FIGS. 4A and 4B, or the plurality of rounded rubber stops 234 may shaped and positioned such as to mirror one another on the opposing surface portions 212A and 212B on opposite sides of the resilient securement slot 210.

The skirt lock 202 may be made of various materials, such that the weight of the skirt lock 202 improves the efficiency of the RV 100. In embodiments, the securement surface 212 may be made of rubber, neoprene, silicone, or combinations thereof. Moreover, the skirt lock body 204 may be formed of material that has a hardness of 45 shore A to 95 shore A on the durometer scale, a hardness of 55 shore A to 85 shore A on the durometer scale, or a hardness of 60 shore A to 80 shore A on the durometer scale. As such, the skirt lock body 204 may be made of polyvinyl chloride (PVC) polyurethane, or any other suitable material. The skirt lock body 204 the securement surface 212, and the surface projections 230 may be made of the same or different materials. In embodiments, the securement surface 212 is formed from a material that is softer than a material of the skirt lock body 204.

Figure 5C:
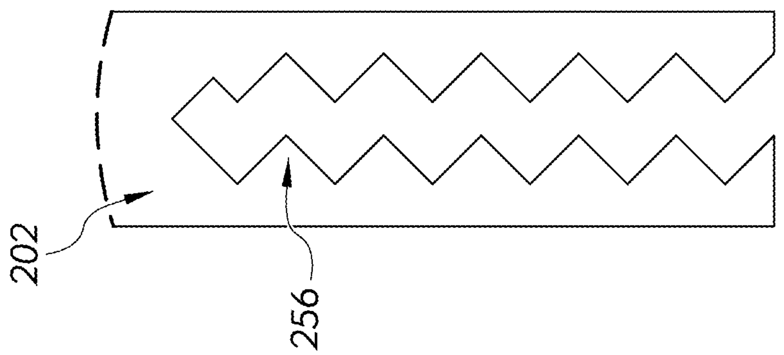
FIG. 5C illustrates a cross-sectional view of a securement surface of a skirt lock with a third pattern, according to one or more embodiments of the present disclosure.
Figure 5B:
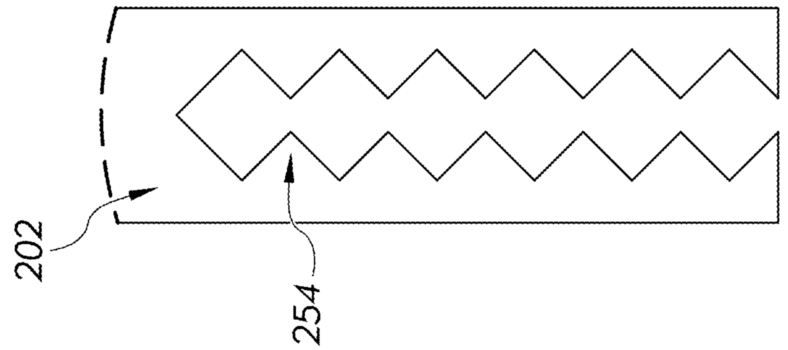
FIG. 5B illustrates a cross-sectional view of a securement surface of a skirt lock with a second pattern, according to one or more embodiments of the present disclosure.
Figure 5A:
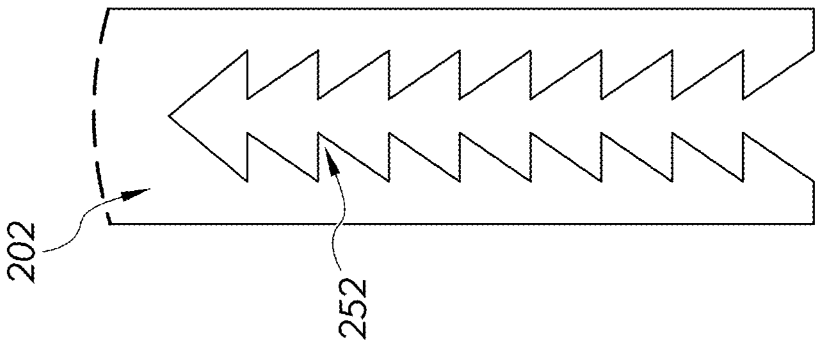
FIG. 5A illustrates a cross-sectional view of a securement surface of a skirt lock with a first pattern, according to one or more embodiments of the present disclosure.

Now referring to FIG. 5A-5C, as noted hereinabove, the securement surface 212 may include a variety of securement surface features 250 to prevent the RV skirt 201 form slipping in the downward direction D when the RV skirt 201 is inserted into the resilient securement slot 210. For example, as depicted in FIG. 5A, the securement surface 212 may form upward triangles 252. The upward triangles 252 may mirror one another on the opposing surface portions 212A and 212B on opposite sides of the resilient securement slot 210. The upward triangles 252 may also alternate on the opposing surface portions 212A and 212B of the resilient securement slot 210. As depicted in FIG. 5B, the securement surface features 250 may form substantially equilateral triangles 254. The substantially equilateral triangles 254 may mirror one another on the opposing surface portions 212A and 212B on opposite sides of the resilient securement slot 210 or alternate. In embodiments, securement surface 212 may include corrugated securement surface features 256, as depicted in FIG. 5C. The corrugated securement surface features 256 may include the upward triangles 252, the substantially equilateral triangles 254, or any other suitable shape. In embodiments, the securement surface 212 may not include triangles, but may also include rounded bumps or any other suitable securement surface feature shape.

Referring again to FIG. 2A, the rear side 206 of the skirt lock body 204 may include an adhesive gap 236. The adhesive gap 236 may be sized such that adhesive 238 may be placed in the adhesive gap 236 between the skirt lock body 204 and the exterior wall 104 of the RV 100. The adhesive 238 may be used to secure the skirt lock 202 to the exterior wall 104 of the RV 100 during manufacturing. The adhesive gap 236 may be 1⁄16 inch, 1⁄8 inch, 1⁄4 inch, 1⁄2 inch, 1 inch, or more in the horizontal direction H (i.e., into the skirt lock body 204). The adhesive 238 may secure the skirt lock 202 to the exterior wall 104 of the RV 100 until the plurality of fasteners 214 are inserted through the skirt lock 202 and the RV skirt 201.

The skirt lock 202 and the RV skirt 201 may be fastened to the exterior wall 104 of the RV through the use of the plurality of fasteners 214. During manufacturing, the skirt lock 202 may be secured to the exterior wall 104 through the use of the adhesive 238 and the RV skirt 201 may be secured to the exterior wall 104 through the skirt lock 202 (i.e., when the RV skirt 201 is inserted into the resilient securement slot 210). The adhesive 238 and the resilient securement slot 210 may secure the skirt lock 202 and the RV skirt 201 to the exterior wall 104 during manufacturing of the RV 100. However, when the RV 100 is driving down a road, the RV 100 may encounter greater forces compared to when the RV 100 is stationary, such as when the RV 100 turns sharply or goes over a pothole. As such, the plurality of fasteners 214 may extend through the RV skirt 201 and the skirt lock 202 to further fasten the RV skirt 201 and the skirt lock 202 to the exterior wall 104 of the RV body 103. The plurality of fasteners 214 may extend through the skirt lock 202 along an entire length of the RV. The plurality of fasteners 214 may be spaced apart from 6 inches (15.24 cm) to 36 inches (91.44 cm), from 12 inches (30.48 cm) to 30 inches (76.2 cm), or from 18 inches (45.72 cm) to 24 inches (60.96 cm). The plurality of fasteners 214 may be uniformly or variably spaced apart.

As depicted in FIG. 2B, the front side 208 of the skirt lock 202 may include a skirt lock nose 240 and the rear side 206 of the skirt lock 202 may include a skirt lock tail 242. The skirt lock tail 242 extends downwardly (i.e., in the downward direction D) to a greater extent than the skirt lock nose 240. The skirt lock tail 242 may be at least about 3 inches longer than the skirt lock nose 240, about 2 inches (5.08 cm) longer than the skirt lock nose 240, about 1 inch (2.54 cm) longer than the skirt lock nose 240, or about 0.5 inches (1.27 cm) longer than the skirt lock nose 240, such as to provide a large enough area for installers to reliably fasten the RV skirt 201 and the skirt lock tail 242 to the exterior wall 104 of the RV body 103 through the plurality of fasteners 214. Notably, the plurality of fasteners 214 may not extend through the skirt lock nose 240. In embodiments, the plurality of fasteners 214 extend through the RV skirt 201 and the skirt lock tail 242 of the skirt lock 202 into the exterior wall 104 of the RV body 103 to fasten the RV skirt 201 to the exterior wall 104 of the RV body 103. Moreover, the plurality of fasteners 214 may extend through a fastener-receiving skirt lock tail 242 of the skirt lock 202. Specifically, the rear side 206 of the skirt lock 202 may extend downwardly in the downward direction D along the direction of the skirt lock plane 260 below the lower open end 226 of the resilient securement slot 210 and a drip edge 264 of the skirt lock 202 to form the fastener-receiving skirt lock tail 242 of the skirt lock 202.

Referring again to FIG. 2A, the rear side 206 of the skirt lock body 204 may secure flush on the exterior wall 104 of the RV body 103 due to the adhesive gap 236 that gives room for the adhesive 238 between the skirt lock body 204 and the exterior wall 104 of the RV body 103. The flush securement of the skirt lock 202 onto the exterior wall 104 of the RV body 103 may prevent liquid from dripping between the skirt lock 202 and the exterior wall 104 of the RV body 103. This may prevent rust/damage of the exterior wall 104 or the chassis 101 of the RV 100. To further assist in water prevention between the skirt lock 202 and the exterior wall 104 of the RV body 103, the front side 208 of the skirt lock body 204 may include a sloped surface 244 that prevents liquid from entering between the rear side 206 of the skirt lock body 204 and the exterior wall 104 of the RV body 103. Specifically, the sloped surface 244 may begin at an upward end 246 of the skirt lock body 204 and end on the skirt lock nose 240. The front side 208 of the skirt lock 201 may extend downwardly in the downward direction D from the sealing edge 262 to the drip edge 264 of the skirt lock.

Although embodiments describe the skirt lock 202 on the RV body 103, it should be understood that embodiments of the present disclosure may also encompass only the skirt lock 202 and all of the supporting descriptions of the skirt lock 202.

The present disclosure also encompasses methods of fastening the RV skirt 201 of the exterior wall 104 of the RV body 103. The method includes securing the rear side 206 of the skirt lock body 204 to the exterior wall 104 of the RV 100. The method also includes securing the upper portion 203 of the RV skirt 201 within the resilient securement slot 210 by sliding the upper portion 203 of the RV skirt 201 into the resilient securement slot 210 in contact with the securement surface 212 and fastening the skirt lock 202 and the RV skirt 201 to the exterior wall 104 of the RV 100 using the plurality of fasteners 214.

In embodiments where there are a plurality of the RV skirts 201 (as described hereinabove), the method may include sliding the plurality of RV skirts 201 within the resilient securements lot 210 such that the plurality of RV skirts 201 are adjacent to one another along the length 190 of the RV body 103.

The method may also include securing the rear side 206 of the skirt lock body 204 to the exterior wall 104 by applying the adhesive 238 to either the exterior wall 104 of the RV 100 or the adhesive gap 236 on the rear side 206 of the skirt lock body 204 to secure the rear side 206 of the skirt lock body 204 to the exterior wall 104 of the RV 100.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

The terms "upper" and "lower," as used herein to describe the RV Skirt and skirt lock, refer to orientation of the skirt and skirt lock when secured to the RV via the skirt lock, with the RV posed in its operating position on a horizontal surface.

The term "downwardly," as used herein to describe the skirt lock nose and tail, refers to the orientation of the skirt lock when secured to the RV, with the RV posed in its operating position on a horizontal surface.

The term "upwardly," as used herein to describe the skirt lock nose and tail, refers to the orientation of the skirt lock when secured to the RV, with the RV posed in its operating position on a horizontal surface.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle (RV) comprising:

a chassis;

an RV body enclosing a living area supported by the chassis, wherein the RV body comprises an exterior wall;

an RV skirt comprising an upper portion and a lower portion; and a skirt lock comprising:

a skirt lock body comprising a rear side and a front side, wherein the rear side of the skirt lock body is secured to the exterior wall of the RV body and the front side faces away from the RV body;

a resilient securement slot between the rear side and the front side of the skirt lock body, wherein the resilient securement slot comprises a securement surface that secures the upper portion of the RV skirt within the resilient securement slot; and a plurality of fasteners, extending through the skirt lock and the RV skirt into the RV body to fasten the skirt lock and the RV skirt to the exterior wall of the RV body.

2. The RV of claim 1, wherein the securement surface comprises opposing surface portions on opposite sides of the resilient securement slot.

3. The RV of claim 2, wherein the opposing surface portions of the securement surface define an upwardly expanding skirt lock width.

4. The RV of claim 3, wherein:

the resilient securement slot is between approximately 0.5 inches (1.27 cm) and approximately 1.5 inches (3.81 cm) in length;

the skirt lock defines an upward expansion angle of between approximately 1 degree and approximately 5 degrees.

5. The RV of claim 1, wherein the securement surface comprises surface projections that secure the upper portion of the RV skirt within the resilient securement slot.

6. The RV of claim 5, wherein the surface projections are shaped and oriented such that the resilient securement slot as a whole defines a static coefficient of friction in a downward direction that is greater than a dynamic coefficient of friction in an upward direction.

7. The RV of claim 6, wherein the surface projections are upwardly angled such that the resilient securement slot defines the dynamic coefficient of friction, relative to the RV skirt moving into the skirt lock slot, that is significantly lower than the static coefficient of friction relative to the RV skirt at rest in the resilient securement slot.

8. The RV of claim 1, wherein:

the front side of the skirt lock body comprises a skirt lock nose;

the rear side of the skirt lock body comprises a skirt lock tail;

the skirt lock tail extends downwardly to a greater extent than the skirt lock nose; and the plurality of fasteners extend through the RV skirt and the skirt lock tail of the skirt lock into the exterior wall of the RV body to fasten the skirt lock and the RV skirt to the exterior wall of the RV body.

9. The RV of claim 1, wherein:

the front side of the skirt lock extends downwardly from a sealing edge to a drip edge of the skirt lock; and the rear side of the skirt lock extends downwardly along a direction of a skirt locking plane below the open end of the resilient securement slot and the drip edge of the skirt lock to form the fastener-receiving skirt lock tail.

10. The RV of claim 1, wherein the rear side of the skirt lock body comprises an adhesive gap and an adhesive positioned in the adhesive gap between the skirt lock and the exterior wall of the RV.

11. The RV of claim 1, wherein the rear side of the skirt lock body secures flush on the exterior wall of the RV body and the front side of the skirt lock body comprises a sloped surface that prevents liquid from entering between the rear side of the skirt lock body and the exterior wall of the RV body.

12. The RV of claim 1, wherein:

the resilient securement slot is positioned between the front side and the rear side of the skirt lock along a skirt locking plane; and the RV comprises a plurality of RV skirts positioned adjacent to one another in the skirt locking plane along a bottom edge of substantially an entire length of the RV body.

13. The RV of claim 1, wherein:

the securement surface comprises surface projections that secure the upper portion of the RV skirt within the resilient securement slot;

the securement surface comprises opposing surface portions on opposite sides of the resilient securement slot; and and the opposing surface portions of the securement surface define an upwardly expanding skirt lock width.

14. The RV of claim 1, wherein:

the rear side of the skirt lock body comprises an adhesive gap and an adhesive positioned in the adhesive gap between the skirt lock and the exterior wall of the RV; and the rear side of the skirt lock body secures flush on the exterior wall of the RV body and the front side of the skirt lock body comprises a sloped surface that prevents liquid from entering between the rear side of the skirt lock body and the exterior wall of the RV body.

15. The RV of claim 1, wherein:

the securement surface comprises surface projections that secure the upper portion of the RV skirt within the resilient securement slot;

the securement surface comprises opposing surface portions on opposite sides of the resilient securement slot; and the opposing surface portions of the securement surface define an upwardly expanding skirt lock width.

16. A method of fastening an RV skirt to an exterior wall of an RV body, the method comprising:

securing a rear side of a skirt lock body to the exterior wall of the RV, wherein the skirt lock body comprises the rear side, a front side, and a resilient securement slot between the rear side and front-side of the skirt lock body, wherein the resilient securement slot comprises a securement surface;

securing an upper portion of the RV skirt within the resilient securement slot by sliding the upper portion of the RV skirt into the resilient securement slot in contact with the securement surface; and fastening the skirt lock and the RV skirt to the exterior wall of the RV using a plurality of fasteners.

17. The method of claim 16, further comprising sliding a plurality of RV skirts within the resilient securement slot such that the plurality of RV skirts are positioned adjacent to one another in a skirt locking plane along a bottom edge of substantially an entire length of the RV body.

18. The method of claim 16, wherein the rear side of the skirt lock body is secured to the exterior wall of the RV by applying adhesive to either the exterior wall of the RV or an adhesive gap on the rear side of the skirt lock body.

19. A skirt lock comprising a front side, a rear side, a resilient securement slot, and a fastener-receiving skirt lock tail, wherein:

the resilient securement slot is positioned between the front side and the rear side of the skirt lock along a skirt locking plane;

the resilient securement slot comprises an upper closed end, and a lower open end for receiving an upper portion of an RV skirt and a securement surface positioned along the skirt locking plane;

the securement surface comprises opposing surface portions on opposite sides of the resilient securement slot and defines a dynamic coefficient of friction, relative to an RV skirt moving into the skirt lock slot, that is significantly lower than a static coefficient of friction relative to an RV skirt at rest in the resilient securement skirt lock slot;

the front side of the skirt lock extends downwardly from a sealing edge to a drip edge of the skirt lock; and the rear side of the skirt lock extends downwardly along a direction of the skirt locking plane below the open end of the resilient securement slot and the drip edge of the skirt lock to form the fastener-receiving skirt lock tail.

* * * * *